Patented Sept. 12, 1944

2,358,072

UNITED STATES PATENT OFFICE 2,358,072

PREPARATION OF PHENOBARBITAL

Marc T. Inman, Nyack, and William P. Bitler, Haverstraw, N. Y., assignors to Kay-Fries Chemicals, Inc., West Haverstraw, N. Y., a corporation of New York No Drawing. Application September 12, 1941, Serial No. 410,577

9 Claims. (Cl. 260—257)

This invention relates to improvements in the preparation of phenobarbital.

In the preparation of phenobarbital it has been the practice to condense phenyl ethyl malonic ester with urea, in the presence of sodium ethylate as a condensing agent. The process is carried out in the presence of an excess of the condensing agent at relatively high concentration of sodium and high temperatures. A disadvantage of this process resides in the fact that cleavage of the phenyl ethyl malonic ester takes place, resulting in a large decrease in yield due to the formation of undesired by-products.

It has now been found that these prior art disadvantages can be overcome by adding sodium ethylate solution gradually to the reaction mixture and controlling the temperature of reaction with the result that the extent of cleavage of the phenyl ethyl malonic ester is substantially suppressed, although the conversion into the desired product is somewhat lowered. The recoverable yield of the finished product is greatly increased and the undesirable side reactions are substantially done away with.

In the practice of the process according to the present disclosure, a reaction mixture of phenyl ethyl malonic ester with an appreciable excess of urea, in a suitable solvent, such as absolute ethyl alcohol, is prepared and introduced into a convenient reaction vessel. The condensing agent, usually sodium ethylate, in absolute ethanol, is added slowly, and desirably with cooling, to the reaction mixture under conditions such that any excess of sodium present at a given instance of time is minimized, and, the amount of extent of cleavage of the phenyl ethyl malonic ester is cut down or substantially eliminated.

By these improvements the process may be carried out smoothly and without undesirable side reactions taking place so that the final product may be easily recovered in a purer state than ordinarily, due to the suppression of formation of by-products. The net result of this procedure is that although a relatively lesser yield of phenobarbital is secured from the reaction, the saving in unconverted phenyl ethyl malonic ester offsets the decreased yield, and a commercially practicable process gives a purer product at appreciably reduced costs.

The following specific example of the process is given by way of illustration:

528 g. phenylethyl malonic diethyl ester is dissolved in 500 cc. of absolute alcohol. There is then added 140 g. urea to the mixture. To this mixture there is then added a solution of 57.5 g. sodium in 1000 cc. absolute alcohol, at such a rate that one-half the solution is added during the first hour, a quarter the second hour, an eighth the third hour, and the final eighth during the fourth hour. As the sodium alcoholate solution is added, alcohol is distilled from the reaction mixture. Up to this point, the temperature of the reaction mixture will vary between 84–86° C. Application of vacuum may be necessary so as not to exceed a liquid temperature of 86° C. When the alcohol has all been removed, 250 cc. xylol is added to the mixture. The reaction mixture is cooled to room temperature and three liters of water added. The xylene layer was separated and the water solution washed with another 200 cc. portion of xylene. There is then added to the water solution a 10% excess of a 50% by weight solution of sulphuric acid. The phenobarbital is precipitated as nearly white fluffy crystals, which are filtered off. When dried, they showed 100% phenobarbital by titration. This product may be purified by recrystallization. The unreacted ester in the xylene solution was recovered by distilling off the xylene, and then the phenylethyl malonic ester.

It will now be appreciated that there has been disclosed a novel process for the manufacture of phenobarbital by condensing phenyl ethyl malonic ester with urea under conditions such that the normally undesired side reactions caused by cleavage of the malonic ester are avoided by maintaining the amount of sodium present at any time in the reaction below that at which appreciable decomposition of malonic ester is effected.

What is claimed is:

1. In the process for the manufacture of phenobarbital by condensing phenyl ethyl malonic ester with urea, without cleavage of the malonic ester and in the presence of sodium ethoxide as a condensing agent, the improvement comprising adding aliquot portions of sodium ethoxide to the reaction mixture of the ester and urea by timed additions so that the sodium alcoholate is never present in amounts in excess of those needed to effect the condensation and thereby precludes cleavage reaction of the sodium ethoxide upon the malonic ester.

2. The improvements in the manufacture of phenobarbital comprising first preparing a reaction mixture of phenyl ethyl malonic ester and an excess of urea, and condensing the same by the timed addition of aliquot portions of sodium in amount sufficient to effect the desired reaction, the sodium being added as sodium ethoxide and in amount sufficient only to effect the desired condensation, and thereby avoid cleavage of the malonic ester.

3. The method of preparing phenobarbital comprising dissolving phenyl ethyl malonic diethyl ester in absolute alcohol, adding reactive amounts of urea to the so formed ester solution, and then adding aliquot portions of sodium ethoxide to the reaction mixture in amount such that the sodium ethoxide is never present in excess of the amount needed to effect the condensation and thus no free sodium ethoxide is available at any time to effect cleavage of the malonic ester.

4. Method according to claim 3, in which alcohol is removed concomitantly with the introduction of the sodium ethoxide.

5. Method according to claim 3, in which sodium ethoxide is added to the ester solution in a four hour time period as follows: one-half during the first hour; one-quarter during the second hour; one-eighth during each of the third and fourth hours.

6. Method according to claim 3, in which the dealcoholized reaction products are purified by washing with xylol, then with water, separating the wash water and washing with xylol, and the phenobarbital precipitated out of the water layer by strong sulphuric acid, filtered, dried, and recrystallized.

7. The method of preparing phenobarbital comprising dissolving 528 g. phenyl ethyl malonic diethyl ester in 500 cc. of absolute alcohol; adding 140 grams of urea to the alcoholic ester solution; condensing the urea-ester with alcoholic sodium ethoxide comprising 57.5 g. sodium dissolved in 1000 cc. absolute alcohol, the ethoxide solution being added over a four hour period so that the ethoxide is never present in amounts in excess of that needed to effect the condensation and thereby avoid cleavage of the malonic ester, the evolved alcoholate being continuously removed while the reaction temperature is desirably maintained within a temperature range of 84–86° C.; washing the reacted mixture with 250 cc. xylol, cooling to room temperature, washing with water and removing separated xylene; adding 200 cc. fresh xylene and treating with a 10% excess of sulphuric acid (50% by weight) to precipitate out phenobarbital; and filtering off the phenobarbital.

8. Process according to claim 7 in which the hourly added aliquot portions of sodium ethoxide are respectively one-half, one-quarter, one-eighth and one-eighth, of the total amount.

9. Process according to claim 7, in which the recovered phenobarbital is dried and recrystallized.

MARC T. INMAN.
WILLIAM P. BITLER.